United States Patent Office 3,598,757
Patented Aug. 10, 1971

3,598,757
CYCLIC BORATE ANTIOXIDANT MIXTURE
Henryk A. Cyba, Evanston, Ill., assignor to Universal
Oil Products Company, Des Plaines, Ill.
No Drawing. Filed Dec. 2, 1968, Ser. No. 780,600
Int. Cl. B01j 1/16
U.S. Cl. 252—400    5 Claims

ABSTRACT OF THE DISCLOSURE

Synergistic mixture of a cyclic borate containing one nitrogen in the ring and at least one of a hydroxyphenone, an N-hydroxyphenyl-benzotriazole and a salicylic acid ester. This mixture is used as an additive to stabilize plastic from deterioration due to weathering, oxidation, heat, etc.

BACKGROUND OF THE INVENTION

I have heretofore disclosed the use of borates of certain alkanolamines as additives in plastic to inhibit deterioration of the plastic due to weathering, oxidation, heat, etc. I also have heretofore disclosed the use of these borates of certain alkanolamines in admixture with certain other additives which effects a synergistic activity in the stabilization of plastic. In such prior disclosures, borates of the alkanolamines were either of a non-cyclic configuration or contained more than one nitrogen in the cyclic structure.

DESCRIPTION OF THE INVENTION

The present invention discloses an improvement in the synergistic mixture. This improvement entails the use of a particular cyclic borate in admixture with one or more other specific components. The cyclic borate for use in the synergistic mixture is extremely stable both against hydrolysis and high temperature. In addition, a number of these cyclic borates are available commercially at a reasonable cost. Accordingly, the use of such borates in the synergistic mixture offers advantages from both economic and stability considerations, as well as being highly effective for use in the stabilization of plastic.

As hereinbefore set forth, the cyclic borate for use in the synergistic mixture contains one and only one nitrogen in the ring. In a generic description, the cyclic borate will be of the following structural formula:

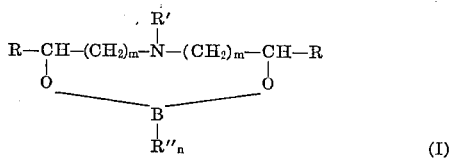

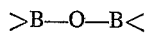   (I)

where R is hydrogen, alkyl of from one to four carbon atoms, mono- or polyaminoalkyl containing from one to four carbon atoms in each alkyl, R' is alkylenoxy having a straight chain of two or three carbon atoms, alkyl of one to 30 carbon atoms, cycloalkyl or aryl, R" is alkyl of from one to 30 carbon atoms, cycloalkyl, aryl, hydroxy, alkoxy of from one to 30 carbon atoms, or oxygen resulting in the following configuration:

>B—O—B< and n is zero or one, m is one or two or is zero when R' is hydrocarbyl.

In one embodiment, a particularly preferred cyclic borate is described where R' in Formula I is alkylenoxy as defined above and n is zero. Cyclic borates in this embodiment are illustrated by the following structural formula:

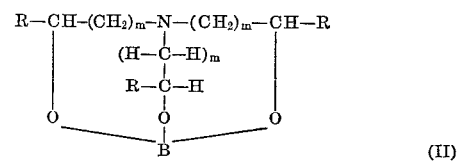

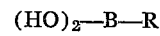   (II)

where R is hydrogen, alkyl, alkylene, aminoalkyl, dialkylaminoalkyl, cycloalkylaminoalkyl, alkoxyalkyl, hydroxyalkyl, alkyleneoxyalkyl, aryl or aryloxyalkyl, said alkyl and alkylene each being from one to four carbon atoms, and m is one or two.

Particularly preferred cyclic borates defined by Formula II include triethanolamine borate (R in Formula II being hydrogen) and triisopropanolamine borate (R in Formula II being methyl). These borates are available commercially as "Borester" 20 and 21, respectively, and are very stable to hydrolysis. Furthermore, they are solids, white in color and odorless. As mentioned above, these compounds are commercially available or they may be prepared in any suitable manner as, for example, by the reaction of a tri-lower-alkanolamine and a tri-lower-alkyl borate. Illustrative examples include the reaction of triethanolamine with trimethyl borate, triisopropanolamine with trimethyl borate, etc. Details of the preparation are described in U.S. Pat. 3,103,531.

In another embodiment, a preferred cyclic borate is described, referring to Formula I, where R is aminoalkyl, R' and R" are alkyl and n is one. A cyclic borate having this formula is readily prepared by the reaction of a suitable borylating agent with a polymeric alkanolamine available commercially. The polymeric alkanolamine is prepared by reacting an N-alkyl-alkylenediamine with an epihalohydrin and particularly epichlorohydrin, followed by reacting with an inorganic base to liberate the free amine and thereafter heating to form the polymeric reaction product. In another embodiment, R' is cycloalkyl and particularly cyclohexyl or aryl and particularly phenyl. The cyclic borate is prepared by reacting the polymeric product with a suitable borylating agent. The borylating agent is selected from boric acid, boric oxide tri-loweralkyl borates, in which the reaction is effected by transesterification, or a boronic acid of the formula (HO)₂—B—R where R is alkyl of from one to 30 carbon atoms, aryl and particularly phenyl, or alkaryl and particularly alkylphenyl in which the alkyl contains from one to 30 carbon atoms. The reaction is readily effected by refluxing the reactants, at a temperature within the range of 60° to 200° C., in the presence of a solvent such as benzene, toluene, xylene, etc. Stoichiometric amounts of the borylating agent will be used. This means that one mole proportion of borylating agent is used per each mole proportion of dialkanolamine moiety in the polymer to be reacted. When R" in Formula I is alkoxy, the reaction is effected using a suitable alkanol containing from one to 30 carbon atoms, in addition to the borate, in order that the free hydroxyl group attached to the boron will react to form the desired compound. The cyclic borate will be of the following structural formula:

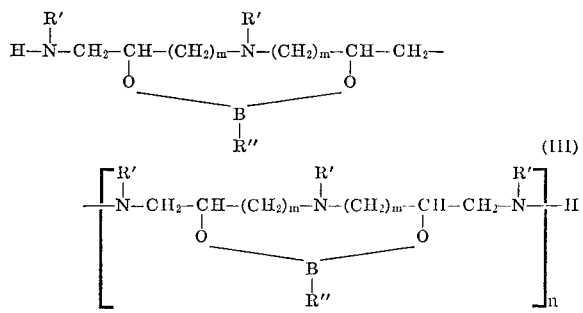

where R' is alkyl of from one to 30 carbon atoms, cycloalkyl aryl or alkaryl, R" is hydroxy, alkoxy of from one to 30 carbon atoms, alkyl of from one to 30 carbon atoms, cycloalkyl, aryl or alkaryl and $n$ is from one to 10, preferably from two to eight, and $m$ is zero, one or two.

Structural Formulas II and III illustrate specific cyclic borates for use in the synergistic mixture of the present invention. It is understood that other suitable cyclic borates meeting the definition of Formula I may be used for the purposes of the present invention.

As hereinbefore set forth, the cyclic borate forms a synergistic mixture wtih a hydroxyphenone, an N-hydroxyphenylbenzotriazole and/or a salicylic acid ester. Any suitable hydroxyphenone is used in the synergistic mixture. Any suitable hydroxyphenone is used in the synergistic mixture. The hydroxyphenone is of the following structural formula:

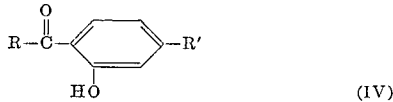

where R is selected from the group consisting of aryl, alkyl, alkylene and cycloalkyl and R' is selected from the group consisting of hydrogen, alkyl, alkylene, cycloalkyl, hydroxy, alkoxy, alkyleneoxy, aryloxy, cycloalkoxy, hydroxyalkyloxy and carboxylalkyloxy.

Where R is aryl, the hydroyphenone is a hydroxybenzophenone. It is understood that the hydroxybenzophenone may contain one or a plurality of hydroxy groups and, in fact, a particularly preferred hydroxybenzophenone is 2,2'-dihydroxybenzophenone. Other hydroxybenzophenones include 2-hydroxybenzophenone, 2,3-dihydroxybenzophenones 2,5-dihydroxybenzophenone, 2,6-dihydroxybenzophenone, 2,3,5-trihydroxybenzophenone, 2,3,5,6 - tetrahydroxybenzophenone, 2,2',3,3'-tetrahydroxybenzophenone, 2,2',4,4'-tetrahydroxybenzophenone, 2,2',5,5'-tetrahydroxybenzophenone and 2,2',6,6'-tetrahydroxybenzophenone, 2,2' - dihydroxy - 4,4' - dimethoxy-5-sulfobenzophenone and its sodium or potassium salt, etc.

Where R in the above formula is aryl and R' is a substituent selected from those hereinbefore set forth, illustrative but not limiting examples of hydroxybenzophenones include 2-hydroxy-4-alkylbenzophenone in which the alkyl contains from one to 30 carbon atoms and preferably from one to 18 carbon atoms and thus is selected from methyl, ethyl, propyl, butyl, pentyl, hexyl, heptyl, octyl, nonyl, decyl, undecyl, dodecyl, etc., 2-hydroxy-4-cycloalkylbenzophenone in which the cycloalkyl contains from 3 to 12 carbon atoms in the cycloalkyl ring and preferably is cyclohexyl but may be cyclopropyl, cyclobutyl, cyclopentyl, cycloheptyl, cyclooctyl, cyclononyl, cyclodecyl, etc., 2-hydroxy-4-alkoxybenzophenone in which the alkoxy group contains from one to 20 carbon atoms and preferably three to 20 carbon atoms and thus is selected from propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy, octadecoxy, etc., 2-hydroxy-4-aryloxybenzophenone in which the aryloxy group is selected from phenoxy, toluoxy, xyloxy, etc., 2-hydroxy-4-cycloalkoxybenzophenone in which the cycloalkyl ring contains from three to 12 carbon atoms and is selected from cyclopropoxy, cyclobutoxy, cyclopentoxy, cyclohexoxy, cycloheptoxy, cyclooctoxy, cyclononoxy, cyclodecoxy, cycloundecoxy and cyclododecoxy and similarly substituted compounds where two or more of the same or different groups selected from those set forth hereinbefore are attached to one or both of the phenyl rings. In addition, one of the aromatic rings may be substituted by carboxy group, sulfo group or halo group such as in the compounds 2-hydroxy-4-methoxy-2'-carboxybenzophenone or 2-hydroxy-4-methoxy-5-sulfobenzophenone trihydrate, etc.

Where the hydroxybenzophenone contains a hydroxy group on each of the phenyl rings, the hydroxy groups preferably are in the position of 2,2'- and accordingly a preferred hydroxybenzophenone for use in the present invention is 2,2'-dihydroxybenzophenone. Illustrative but not limiting compounds in this embodiment of the invention include 2,2'-dihydroxy-4-alkylbenzophenone, 2,2'-dihydroxy-4,4'-dialkylbenzophenone, 2,2'-dihydroxy-4-cycloalkylbenzophenone, 2,2'-dihydroxy-4,4'-dicycloalkylbenzophenone, 2,2' - dihydroxy - 4-alkoxybenzophenone, 2,2' - dihydroxy - 4,4' - dialkoxybenzophenone, 2,2'-dihydroxy-4-aryloxybenzophenone, 2,2'-dihydroxy-4,4'-diaryloxybenzophenone, 2,2' - dihydroxy-4-cycloalkoxybenzophenone and 2,2'-dihydroxy-4,4'-dicycloalkoxybenzophenone, in which these substituents are selected from those specifically hereinbefore set forth. Here again, it is understood that one or both of the phenyl rings may contain two or more of the same or different substituents selected from those set forth above.

Where R in Formula IV is alkyl, illustrative hydroxyphenones include 2-hydroxyacetophenone, 2-hydroxypropionphenone, 2 - hydroxybutyrophenone, 2 - hydroxyvalerophenone, 2 - hydroxycaprylophenone, 2 - hydroxylaurylphenone, 2 - hydroxypalmitylphenone, etc. Here again it is understood that the phenyl ring may contain one or more of the substituents hereinbefore set forth and also that the alkyl moiety may contain one or more substituents attached thereto, these substituents preferably being selected from those hereinbefore specifically set forth. Where R in the above formula is cycloalkyl, the cycloalkyl preferably is cyclohexyl or it may be cyclopropyl, cyclobutyl, cyclopentyl, cycloheptyl, cyclooctyl, cyclononyl, cyclodecyl, cycloundecyl, cyclododecyl, etc. Here again the cycloalkyl ring may contain one or more of the substituents hereinbefore set forth.

From the above description, it will be seen that various hydroxyphenones will be used in the synergistic mixture of the present invention. In another embodiment, these include hydroxyphenones which are an integral part of the polymer or are polymeric themselves as, for example, those described in U.S. Pats. 3,385,910 and 3,389,099 or in British Pats. 1,066,404, 990,312, etc. It is understood that the hydroxyphenones may be copolymerized or condensed with the resin, plastic, rubber or other substrate to be protected. The hydroxyphenones generally are available in the open market or may be prepared by conventional means. It is understood that the different hydroxyphenones are not necessarily equivalent in their effectiveness in the mixture of the present invention.

The N-hydroxyphenyl-benzotriazole for use in the synergistic mixture of the present invention is illustrated by the following structural formula:

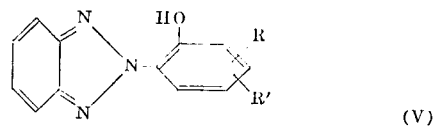

where R and R' are independently selected from hydrogen, alkyl of from one to 30 carbon atoms and alkoxy of from one to 30 carbon atoms.

Referring to Formula V, where R is alkyl and R' is hydrogen, illustrative compounds include 2-(2'-hydroxy-5'-methylphenyl)-benzotriazole and corresponding compounds in which the methyl group is replaced by ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, etc. Additional examples of specific compounds include 2-(2'-hydroxy-5'-octylphenyl)-benzotriazole and 2-(2'-hydroxy-5'-dodecylphenyl)-benzotriazole. Other illustrative compounds include 2 - (2'-hydroxy-3'-methylphenyl)-benzotriazole and corresponding compounds in which the methyl group is replaced by an alkyl group of from two to 30 carbon atoms and particularly a tertiary alkyl group such as tert-butyl, tert-amyl, etc. Other compounds include those in which the alkyl group is in the 4' or 6' position.

Where both R and R' are alkyl in Formula V, illustrative compounds include 2-(2'-hydroxy-3',5'-dimethylphenyl)-benzotriazole and corresponding compounds in which one or both of the alkyl groups are replaced by alkyl groups containing from two to 30 carbon atoms. In particular, tertiary butyl groups are desirable substituents. Here again it is understood that the alkyl groups may be in the positions 3', 4'; 3', 6'; 4', 5'; or 4', 6'.

Where R is alkoxy and R' is hydrogen in Formula V, illustrative compounds include 2-(2'-hydroxy-5'-methoxyphenyl)-benzotriazole and corresponding compounds in which the methoxy group is replaced by an alkoxy group containing from two to 30 carbon atoms. Additional examples of specific compounds include 2-(2'-hydroxy-5'-octoxyphenyl)-benzotriazole and 2-(2'-hydroxy-5'-dodecoxyphenyl)-benzotriazole. Here again, the alkoxy group may be in the 3', 5' or 6' position.

Where R is alkyl and R' is alkoxy in Formula V, illustrative compounds include 2-(2'-hydroxy-3'-methoxy-4'-methylphenyl)-benzotriazole,
2-(2'-hydroxy-3'-methoxy-4'-ethylphenyl)-benzotriazole,
2-(2'-hydroxy-3'-methoxy-4'-propylphenyl)-benzotriazole,
2-(2'-hydroxy-3'-methoxy-4'-tert-butylphenyl)-benzotriazole,
2-(2'-hydroxy-3'-methoxy-4'-tert-pentylphenyl)-benzotriazole,
2-(2'-hydroxy-3'-methoxy-4'-tert-hexylphenyl)-benzotriazole,
2-(2'-hydroxy-3'-methoxy-4'-tert-heptylphenyl)-benzotriazole,
2-(2'-hydroxy-3'-methoxy-4'-tert-octylphenyl)-benzotriazole,
2-(2'-hydroxy-3'-methoxy-4'-tert-nonylphenyl)-benzotriazole,
2-(2'-hydroxy-3'-4'-tert-decylphenyl)-benzotriazole,
2-(2'-hydroxy-3'-methoxy-4'-tert-undecylphenyl)-benzotriazole,
2-(2'-hydroxy-3'-methoxy-4'-tert-dodecyclphenyl)-benzotriazole, corresponding compounds in which the methoxy is replaced by alkoxy containing two to 30 carbon atoms, corresponding compounds in which the tert-alkyl groups are normal alkyl or secondary alkyl, corresponding compounds in which the alkyl and alkoxy group, respectively, are in the positions 3', 5'; 3', 6'; 4', 5'; 4', 6'; 4', 3'; 5', 3'; 5', 4'; 6', 3'; 6', 4'; or 6', 5'.

From the above description, it will be seen that various N-hydroxyphenyl-benzotriazoles may be used in the synergistic mixture of the present invention. Illustrative of various N-hydroxyphenyl-benzotriazoles are those disclosed in British Pats. 981,539, 991,320, 991,204 and 991,205. The N-hydroxyphenyl-benzotriazoles generally are available in the open market or may be prepared by conventional means. It is also understood that N-hydroxyphenyl-benzotriazole may be an integral part of the polymer or therein incorporated via polymerizable link. It is understood that the different N-hydroxyphenyl-benzotriazoles are not necessarily equivalent in their effectiveness in the mixture of the present invention.

Any suitable salicylic acid ester is used in the synergistic mixture of the present invention. Preferred esters are phenyl salicylate (Salol), p-alkylphenyl salicylates in which the alkyl contains from one to 30 carbon atoms including p-t-butylphenyl salicylate, p-t-octylphenyl salicylate or the corresponding n or sec-alkyl counterparts, polyalkylphenyl salicylates, in which each alkyl contains from one to 30 carbon atoms and salicylates in which the ester portion is derived from terpenic moieties, such as homomenthyl, etc. Here again, a number of these salicylic acid esters are available commercially or they may be prepared in any suitable manner. For example, phenol or substituted phenol is reacted with salicylic acid to form the ester. It is understood that the different salicylic acid esters are not necessarily equivalent in their use in the synergistic mixture of the present invention.

The synergistic mixture of the present invention comprises from about 10% to about 90% by weight of the cyclic borate and from about 10% to about 90% by weight of at least one of the hydroxyphenone, N-hydroxyphenyl-benzotriazole and salicylic acid ester. Generally it is preferred that the cyclic borate comprises from about 50% to about 90% by weight and the other component set forth above comprises from about 10% to about 50% by weight of the mixture.

While the synergistic mixture of the present invention is very effective, it is understood that the synergistic mixture may also contain one or more additional additives and more particularly at least one phenolic antioxidant. In one embodiment, the additional antioxidant is a trialkylphenol. A particularly preferred trialkylphenol is 2,6-di-tert-butyl-4-methylphenol known as BHT or butylated hydroxytoluene. Other trialkylphenols include 2,6-di-isopropyl-4-methylphenol,
2,6-diamyl-4-methylphenol,
2,6-dihexyl-4-methylphenol,
2,6-diheptyl-4-methylphenol,
2,6-dioctyl-4-methylphenol,
2,6-dinonyl-4-methylphenol,
2,6-didecyl-4-methylphenol,
2,6-diundecyl-4-alkylphenol,
2,6-didodecyl-4-alkylphenol,
2,6-ditridecyl-4-alkylphenol,
2,6-ditetradecyl-4-alkylphenol,
2,6-dipentadecyl-4-alkylphenol,
2,6-dihexadecyl-4-alkylphenol,
2,6-diheptadecyl-4-alkylphenol,
2,6-dioctadecyl-4-alkylphenol, etc.,
2,4-dimethyl-6-isopropylphenol,
2,4-dimethyl-6-tert-butylphenol,
2,4-dimethyl-6-pentylphenol,
2,4-dimethyl-6-hexylphenol,
2,4-dimethyl-6-heptylphenol,
2,4-dimethyl-6-octylphenol,
2,4-dimethyl-6-nonylphenol,
2,4-dimethyl-6-decylphenol, etc.,
2,6-diethyl-4-alkylphenol,
2,6-dipropyl-4-alkylphenol,
2,6-dibutyl-4-alkylphenol,
2,6-diamyl-4-alkylphenol,
2,6-dihexyl-4-alkylphenol, etc., in which the alkyl contains from one to 20 or more carbon atoms. In one embodiment, the trialkylphenol will contain one or two alkyl groups containing four or less carbon atoms and one or two alkyl groups containing four or more carbon atoms, the latter preferably being of tertiary configuration. These trialkylphenols may be obtained in the open market or prepared in any suitable manner. Here again, it is understood that the different trialkylphenols are not necessarily equivalent in their use in the antioxidant mixture of the present invention.

In another embodiment, the additional antioxidant is 1,1,3-tris-(2-methyl-4-hydroxy - 5 - tert-butylphenyl)-butane. This material is available commercially under the tradename of "Topanol CA." Other related antioxidant compounds may be used and includes, for example, those in which the methyl group is replaced by hydrogen or alkyl of two to six carbon atoms and/or those in which the tert-butyl group is replaced by tert-pentyl, tert-hexyl, tert-heptyl, tert-octyl, tert-nonyl, tert-decyl and/or related compounds in which the butane moiety is replaced by pentane, hexane, heptane, octane, nonane, decane, etc. In another embodiment, this component of the mixture is 2,4-bis-(3,5-di-tert-butyl-4-hydroxyphenyl)-butane. Here again, it is understood that the tert-butyl and/or butane moiety may be replaced by other alkyl groups. These compounds may be obtained in the open market or prepared in any suitable manner.

In another embodiment, the additional antioxidant is dilauryl-thiodipropionate. This compound is available commercially or may be prepared in any suitable manner. It is understood that other satisfactory antioxidants may be used and these include, for example, dicapryl-thiodipropionate, dimyristyl-thiodipropionate, dipalmityl-thiodipropionate, distearyl - thiodipropionate, etc. Still other antioxidants include dilauryl-beta-mercapto-dithio-propionate, distearyl-beta-mercapto-dithiopropionate, and other beta-mercaptodithiopropionates.

In a particularly preferred embodiment, the additional antioxidant comprises both the 1,1,3-tris-(2-methyl-4-hydroxy-5-tert-butylphenyl)-butane and dilauryl-thiodipropionate. Here again, it is understood that a mixture of the corresponding compounds hereinbefore set forth may be used.

When desired, other additives may be included in the synergistic mixture. These may include one or more such other additives selected from phenyl-alpha-naphthylamine,
phenyl-beta-naphthylamine,
phenothiazine,
diphenyl-p-phenylenediamine,
2,2'-methylene-bis-(4-methyl-6-tert-butylphenol),
2,2'-methylene-bis-(4-ethyl-6-tert-butylphenoyl),
4,4'-thio-bis-(6-tert-butyl-o-cresol),
2,6-bis-(2'-hydroxy-3'-tert-butyl-5'-methylbenzyl)-
    4-methylphenol,
[2,2'-thio-bis-(4-tert-octylphenolato)]-n-butylamine
    nickel II,
nickel-bis-dithio-carbamate.

Other additives are unsubstituted and substituted organic phosphites such as aliphatic, aromatic, alicyclic, heterocyclic derivatives including tris-octyl or tris-nonylphenyl phosphites. In particular, polymeric phosphites are desired, especially those of reduced tendency to hydrolyses, such as

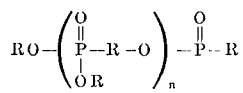

Also di-(neododecyl pentaerythritol)-diphosphite, neododecyl neopentylene phosphite, triethyleneglycol di-neopentyl diphosphite, as well as phosphites disclosed in U.S. Pats. 3,088,917, 3,080,338, 3,053,878, 3,047,608, 3,039,-993, 3,009,939, 2,733,226 and 2,732,365.

Other additives are various tin containing compounds such as stannates, tetravalent tin derivatives such as di-alkyl tin maleate or tin and sulfur containing compounds such as disclosed in British Pats. 1,110,709, 1,060,067 and 1,069,165, dibutyl tin di-(isooctyl thioglycolate), dioctyl tin di-(issoctyl thioglycolate), dibutyl tin di-(lauryl mercaptide, dibutyl tin mercaptide carboxylates, polyamine tin mercaptides, etc. Still other additives include various Irganoxes such as those disclosed in U.S. Pats. 3,255,191 and 3,330,859. In particular, the following Irganoxes are useful: 569, 858, 1076, 1093 or 1010 which is a high molecular solid of the following formula $C_{73}H_{108}O_{12}$, etc., various Ionoxes such as 1,3,5-trimethyl-2,4,6-tris-(3,5-di-tert-butyl-4-hydroxybenzyl)-benzene, 1,2,4,5-tetramethyl-3,6-bis-(3,5-di-tert-butyl-4-hydroxybenzyl)-benzene, etc., various Plastanoxes such as 2,6-bis-(2'-hydroxy-3'-tert-butyl-5'-methylbenzyl)-4-methylphenol, various phosgene alkylphenol reaction products, 2,4-dibenzoyl-resorcinol, resorcinol monobenzoate, hexamethylphosphoric triamide, phosphoric acid-N-methylamide-diamide, phosphoric acid-N,N - dimethylamide - diamide, phosphoric acid-N,N-distearylamide-diamide, phosphoric acid-tri-(N,N-dimethylamide), phosphoric acid-tri-(N-dodecylamide), diphosphoric acid-di-(N-methyl-N-stearylamide), etc. Furthermore, various 1,3,5-triazines may be used such as 6-(4-hydroxy - 3,5 - di-tert-butylanilino)-2,4-bis-(n-octylthio)-1,3,5-triazine or various other triazines as disclosed in British Pat. 994,922.

The additional phenolic antioxidant and, when used, the other additive, will each be used in a concentration of from about 1% to about 50% by weight of the synergistic mixture, although these may be used in higher concentrations which may be as high as 200% by weight of the borate.

The synergistic mixture will be used in a stabilizing concentration and in general will be within the range of from about 0.001% to about 10% and more particularly from about 0.01% to about 2% by weight of the substrate.

As hereinbefore set forth, the synergistic mixture of the present invention is advantageously used as an additive to retard both ultraviolet light and oxidative deterioration, as well as the deterioration due to heat. In one embodiment, this mixture is used in solid polymers including plastics and resins. Illustrative plastics which are stabilized in accordance with the present invention include polyolefins and particularly polyethylene, polypropylene, polybutylene, mixed ethylene propylene polymers, mixed ethylene butylene polymers, mixed propylene butylene polymers, mixed styrene ethylene polymers, mixed styrene propylene polymers, etc. The solid olefin polymers are used in many applications including electrical insulation, light weight outdoor furniture, awnings, cover for greenhouses, etc.

In another embodiment, the polymers to be stabilized include those prepared from diolefinic monomers as, for example, polybutadiene, or those in which the diolefin or diolefins are reacted with monoolefin or monoolefins, including ABS (acrylonitrile - butadiene - styrene polymers).

Another plastic being used commercially on a large scale which is treated in the present invention is polystyrene. The polystyrenes are particularly useful in the manufacture of molded or machined articles which find application in such goods as windows, optical goods, automobile panels, molded household articles, etc.

Another class of plastics available commercially and which are treated in the present invention is broadly classed as vinyl resins and is derived from monomers such as vinyl acetate, vinyl butyrate, etc. Other vinyl type resins which are stabilized in accordance with the present invention include ployvinyl alcohol and copolymers, copolymers of vinyl chloride with acrylonitrile, methacrylonitrile, alkyl acrylates, alkyl methacrylates, alkyl maleates, alkyl fumarates, polyviny butyral, etc., or mixtures thereof.

Other plastics being used commercially on a large scale which are stabilized according to the present invention are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride). Acrilan (polyacrylonitrile modified with vinyl acetate), rayon, etc.

Still other plastics which are stabilized by the present invention are prepared from other monomers and are available commercially. Illustrative examples of such other solid polymers include polycarbonates, polyphenyl oxides (polyphenyl ethers), phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers for stabilization in the present invention include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates for stabilization in the present invention are polyesters, including linear or cross-linked, reinforced polyesters, laminate polyesters, etc., polyurethane resins, epoxy resins, various latexes, lacquers, alkyds, varnishes, polishes, stains, pigments, dyes, textile finishing formulations, cosmetics such as creams, lotions, sprays, etc.

It is understood that the plastic or resin may be fabricated into any desired finished product including moldings, castings, fibers, films, sheets, rods, tubing, foams or other shapes.

Another organic substrate which undergoes deterioration due to oxidation and/or weathering is rubber, and the same is stabilized in accordance with the present invention. Rubber is composed of polymers of conjugated 1,3-dienes, either as polymers thereof or as copolymers thereof with other polymerizable compounds, and may be synthetically prepared or of natural origin. Synthetic rubbers include SBR rubber (copolymer of butadiene and styrene), EPR rubber (terpolymer of ethylene, propylene and a diene), Buna A (copolymer of butadiene and acrylonitrile), butyl rubber (copolymer of butadiene and isobutylene), Thiokol rubber (polysulfide), silicon rubber, etc. Natural rubbers include hevea rubber, cautchouc, balata, gutta percha, etc.

Still other organic substrates which undergo deterioration due to oxidation and/or weathering include paints, varnishes, drying oils, pigments, rust preventative coatings, other protective coatings, etc. These substrates also are stabilized in accordance with the present invention.

The components of the synergistic mixture of the present invention may be added separately to the plastic to be stabilized but preferably the synergistic mixture is first formed by commingling the components, with or without other additives, and then incorporating the mixture in the plastic. When desired, the mixture or the individual components may be utilized as such or prepared as a solution in a suitable solvent. The additives are incorporated in the plastic in any suitable manner, including adding the same to the hot melt, generally in a Banbury mixer, extruder or other device.

The following examples are introduced to illustrate further the novelty and utility of the present invention but not with the intention of unduly limiting the same.

Example I

A borate of a polymeric product as illustrated in Formula III, in which R" is hydroxy and $n$ is about five, was prepared in the following manner. The polymeric product was prepared in the manner described in U.S. Pat. 3,189,652. A mixture of 387.5 g. (0.5 hydroxyl equivalent) of the polymeric product and 15.46 g. (0.25 mole) of boric acid and 100 g. of benzene was refluxed at a temperature of about 135° C. for about two and one-half hours. A total of 10 cc. of water was collected. Following completion of the reaction, the product was filtered and then subjected to distillation at 150° C. under water pump vacuum to remove the benzene solvent. The resultant borate had an acid number of 0.019 meq./g., a basic nitrogen equivalent of 2.54 meq./g. and a mole combining weight of 394.

A synergistic mixture is prepared to comprise 100 pounds of the borate prepared in the above manner and 75 pounds of 2-hydroxy-4'-octoxy-benzophenone, the latter being available commercially as Cyanosorb 531.

Example II

Another synergistic mixture is prepared by adding 15 pounds of butylated hydroxytoluene (2,6-di-tert-butyl-4-methylphenol) to the synergistic mixture described in Example I.

Example III

Another synergistic mixture is prepared by adding to the mixture described in Example II, 30 pounds of 1,1,3-tris-(2-methyl-4-hydroxy-5-tert-butylphenyl) butane, available commercially as Topanol CA and 60 pounds of dilauryl-thiodipropionate.

Example IV

Another synergistic mixture is prepared by commingling 100 pounds of the borate, prepared as described in Example I, and 90 pounds of 2-(2'-hydroxy-5-methylphenyl)-benzotriazole, the latter being available commercially as Tinuvin P.

Example V

Another synergistic mixture is prepared by adding to the mixture described in Example IV, 60 pounds of Topanol CA and 120 pounds of dilauryl-thiodipropionate.

Example VI

Another synergistic mixture is prepared by commingling 100 pounds of the borate, prepared as described in Example I, with 50 pounds of phenyl salicylate, the latter being commercially available as Salol.

Example VII

Another synergistic mixture is prepared by adding to the mixture described in Example VI, 40 pounds of Topanol CA and 75 pounds of dilauryl-thiodipropionate.

Example VIII

Another borate was prepared by the same general steps as described in Example I except that decyl alcohol was reacted along with the boric acid. A mixture of 387.5 g. (0.5 hydroxyl equivalent), 15.46 g. (0.25 mole) of boric acid, 39.5 g. (0.25 mole) of decyl alcohol and 100 g. of benzene was refluxed at a temperature of 120–130° C. The water collected from the reaction amounted to 12.5 cc. The reaction product was filtered and vacuum distilled at 170° C. to remove the solvent. The resulting borate had an acid number of 0.027 meq./g., basic nitrogen equivalent of 2.16 meq./g., and a mole combining weight of 463.

A synergistic mixture is prepared by commingling 100 pounds of the borate prepared in the above manner, 60 pounds of 2,2'-dihydroxy-4-octoxy-benzophenone, the latter being available commercially as Stabilizer No. 314.

Example IX

Another synergistic mixture is prepared by commingling 100 pounds of the borate, prepared as described in Example VIII, with 100 pounds of N-hydroxyphenyl-benzotriazole, the latter being available commercially as Tinuvin 327.

Example X

Another synergistic mixture is prepared by commingling 100 pounds of the borate, prepared as described in Example VIII, 75 pounds of p-octylphenyl salicylate and 15 pounds of butylated-hydroxytoluene.

Example XI

Another cyclic borate is prepared by reacting the polymeric product described in Example I with nonylboronic acid. This results in a borate as defined in Example III in which R" is nonyl.

A synergistic mixture is prepared by commingling 100 pounds of the borate prepared in the above manner with 50 pounds of 2-hydroxy-4-octoxy-benzophenone and 20 pounds of butylated-hydroxytoluene.

Example XII

The synergistic mixture of this example is prepared by using triethanolamine borate as one of the components. Triethanolamine borate is defined by the structure of Formula II in which R is hydrogen. This borate is available commercially as Borester 20 and is a white solid containing approximately 6.75% by weight of boron.

The synergistic mixture is prepared by commingling 100 pounds of the triethanolamine borate with 75 pounds of 2-hydroxy-4'-octoxybenzophenone.

Example XIII

Another synergistic mixture is prepared by incorporating in the mixture described in Example XII, 80 pounds of Topanol CA and 150 pounds of dilauryl-thiodipropionate.

Example XIV

The synergistic mixture of this example is prepared by commingling 100 pounds of triethanolamine borate with 100 pounds of Tinuvin P.

Example XV

Another synergistic mixture is prepared by commingling 50 pounds of Topanol CA and 125 pounds of dilauryl-thiodipropionate with the mixture described in Example XIV.

Example XVI

A synergistic mixture is prepared by commingling 100 pounds of triethanolamine borate, 75 pounds of Salol and 15 pounds of 2,4-dimethyl-6-tert-butylphenol.

Example XVII

The synergistic mixture of this example is prepared by using triisopropanolamine borate as a component. This borate is available commercially as Borester 21 and is a white, odorless solid, extremely stable to hydrolysis and has a typical boron analysis of 5.47% by weight.

A synergistic mixture is prepared by commingling 100 pounds of triisopropanolamine borate with 60 pounds of 2,2'-dihydroxy-4-octoxybenzophenone.

Example XVIII

Another synergistic mixture is prepared by adding 15 pounds of butylated-hydroxytoluene to the mixture described in Example XVII.

Example XIX

A synergistic mixture is prepared by commingling 100 pounds of triisopropanolamine borate with 90 pounds of Tinuvin P.

Example XX

Another synergistic mixture is prepared by commingling 50 pounds of Topanol CA and 95 pounds of dilauryl-thiodipropionate with the mixture prepared in accordance with Example XIX.

Example XXI

Another synergistic mixture is prepared by commingling 100 pounds of triisopropanolamine borate with 85 pounds of p-octylphenyl salicylate.

Example XXII

Still another synergistic mixture is prepared by commingling 20 pounds of butylated-hydroxytoluene with the mixture described in Example XXI.

Example XXIII

The synergistic mixture of this example is prepared by commingling 100 pounds of triethanolamine borate, 50 pounds of 2-hydroxycaprylophenone and 15 pounds of butylated-hydroxytoluene.

Example XXIV

A synergistic mixture is prepared by commingling 100 pounds of triethanolamine borate, 50 pounds of 2-hydroxyacetophenone and 15 pounds of butylated-hydroxytoluene.

Example XXV

A synergistic mixture is prepared by commingling 100 pounds of triisopropanolamine borate, 50 pounds of 2-(2'-hydroxy-4'-methoxyphenyl)-benzotriazole, 30 pounds of 4,4'-dihydroxy-3,3'-di-tert-butyl-5,5'-dimethyldiphenylmethane and 50 pounds of dimyristyl-thiodipropionate.

Example XXVI

As hereinbefore set forth, the mixture of the present invention is of high potency to retard deterioration of plastic caused by weathering, oxidation, heat, etc. due to a synergistic effect.

The plastic used in this example is solid polypropylene which, without additive, is stated to have the properties substantially as follows:

TABLE I

| | |
|---|---|
| Specific gravity | 0.910–0.920 |
| Refractive index, $n_D^{25}$ | 1.510 |
| Heat distortion temperature, °C.: | |
| At 66 p.s.i. load | 116 |
| At 264 p.s.i. load | 66 |
| Tentile yield strength, p.s.i. | 4700 |
| (ASTM D-638–58T) | |
| (0.2" per min.) | |
| Total elongation, percent | 300–400 |
| Stiffness flexural (ASTM D747–50) $10^5$ p.s.i. | 1.8 |
| Shore hardness (ASTM D676–55T) | 74D |

One method of evaluating the effect of weathering is to expose the samples to carbon arc rays in a Fade-Ometer. The polypropylene samples are milled in a two-roll mill of conventional design and the additive, when employed, is incorporated in the sample during the milling. The samples are pressed into sheets of about 17 ml. thickness and cut into plaques of about 1⅜" x 1½". The plaques are inserted into plastic holders, affixed onto a rotating drum and exposed to the carbon arc rays at about 125° F. in the Fade-Ometer. The samples are examined periodically by infrared analysis to determine the carbonyl band at 1715 cm.$^{-1}$ which is reported as the "carbonyl number." The higher intensity of the carbonyl band indicates a higher carbonyl concentration (expressed as carbonyl number) and, accordingly, increased deterioration.

A sample of the polypropylene without additive developed a carbonyl number of greater than 1000 within 120 hours of exposure in the Fade-Ometer. Another sample of the same polypropylene containing 0.15% by weight of butylated hydroxytoluene (2,6-di-tert-butyl-4-methylphenol) developed a carbonyl number of over 1000 within 360 hours of exposure in the Fade-Ometer. Still another sample of the polypropylene was prepared to contain 1% by weight of triisopropanolamine borate (Borester 21) and 0.15% by weight of butylated hydroxytoluene. This sample reached a carbonyl number of over 1000 within 192 hours of exposure in the Fade-Ometer. Still another sample of the polypropylene was prepared to contain 1% by weight of p-octylphenyl salicylate and this sample, when exposed in the Fade-Ometer, reached a carbonyl number of over 1000 within 120 hours of exposure. The above data demonstrate that these components by themselves were of only minor effectiveness in retarding deterioration of the polypropylene.

In contrast to the above, another sample of the polypropylene is prepared to contain 2% by weight of the synergistic mixture described in Example XXII. Upon exposure in the Fade-Ometer, this sample does not reach a carbonyl number of 1000 for more than 1000 hours of exposure. Furthermore, as hereinbefore set forth, the cyclic borate used in this example is extremely stable against hydrolysis and heat, thus even further improving the usefulness of the synergistic mixture.

Example XXVII

The synergistic mixture of Example XIII is milled into another sample of the polypropylene described in Example XXVI in a total concentration of synergistic mixture of 1.5% by weight. The polypropylene containing this synergistic mixture does not reach a carbonyl number of 1000 within 1400 hours of exposure in the Fade-Ometer.

Example XXVIII

The synergistic mixture prepared as described in Example XV is milled in a concentration of 1.25% by weight into another sample of the polypropylene described in Example XXVI. Here again, this mixture serves to extend the time to reach a carbonyl number of 1000 to over 1400 hours upon exposure in the Fade-Ometer.

Example XXIX

The antioxidant potency of an additive is determined in a method similar to that described by Hawkins, Hansen, Matreyek and Winslow in Rubber Chemistry and Technology, October-November, 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 gram each, are placed in separate 8 mm. glass tubes and the tubes then are inserted into horizontal rows of openings located concentrically around the heater. The temperature is maintained at about 284° F. The glass tubing also is packed with glass wool and molecular sieves to absorb the gases. Each of the glass tubes is connected to an individual monometer containing mercury, and the differential pressure is periodically determined. The Induction Period is taken as the number of hours required to reach a pressure differential of 20 cm. Hg.

A control sample (not containing the additive) of the polypropylene has an Induction Period of less than two hours. Another sample of the polypropylene containing 1% of the borate prepared as described in Example I has an Induction Period of about 39 hours. Still another sample of the polypropylene containing 1% by weight of 2-hydroxy-4-octoxybenzophenone (Cyanosorb 531) and 0.15% by weight of butylated hydroxytoluene has an Induction Period of about three hours. In contrast to the above, another sample of the polypropylene containing 1% by weight of the synergistic mixture of Example II imparts an Induction Period to the polypropylene of over 800 hours.

Example XXX

The synergistic mixture of Example VIII is incorporated in a concentration of 1% by weight in polystyrene. The synergistic mixture is incorporated in the polystyrene during milling thereof and serves to inhibit the deterioration of the polystyrene due to weathering and oxidation.

Example XXXI

The synergistic mixture prepared as described in Example XX is incorporated in a concentration of 1% by weight in solid polyethylene of the high-density type. An inhibited product of this polyethylene is marketed commercially under the tradename of Fortiflex.

The synergistic mixture is incorporated in the polyethylene during milling thereof and serves to decrease deterioration of the polyethylene due to weathering.

Example XXXII

The synergistic mixture prepared as described in Example XIII is used in a concentration of 1% by weight as an additive in acrylonitrile-butadiene-styrene polymer available commercially as ABS. The synergistic mixture serves to stabilize ABS against deterioration due to weathering and oxidation.

I claim as my invention:
1. Synergistic mixture of from about 10% to about 90% by weight of a cyclic borate containing one nitrogen in the ring and from about 10% to about 90% by weight of at least one of a hydroxyphenone, an N-hydroxyphenylbenzotriazole and a salicylic acid ester, said cyclic borate being selected from the group consisting of

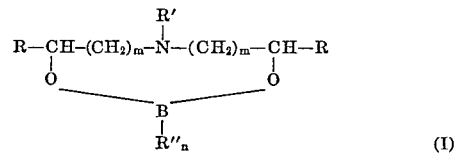

where R is hydrogen, alkyl of from one to four carbon atoms, mono- or poly-aminoalkyl containing from one to four carbon atoms in each alkyl, R' is alkylenoxy having a straight chain of two carbon atoms, alkyl of one to 30 carbon atoms, cycloalkyl or aryl, R" is alkyl of from one to 30 carbon atoms, cycloalkyl, aryl, hydroxy, alkoxy of from one to 30 carbon atoms or oxygen connected to another boron atom, and $n$ is zero or one, $m$ is one or two and is zero when R' is hydrocarbyl;

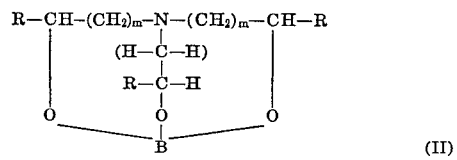

where R is hydrogen, alkyl, alkylene, aminoalkyl, dialkylaminoalkyl, cycloalkylaminoalkyl, akoxyalkyl, hydroxyalkyl, alkyleneoxyalkyl, aryl or aryloxyalkyl, said alkyl and alkylene each being from one to four carbon atoms, and $m$ is one or two and,

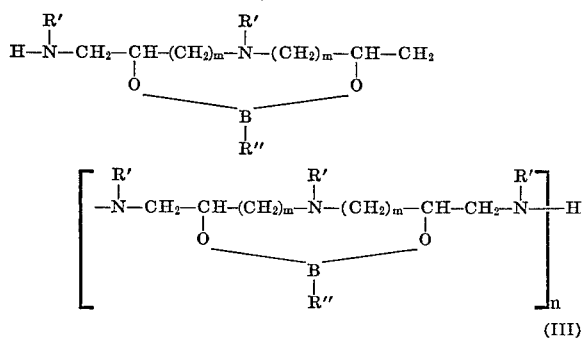

where R' is alkyl of from one to 30 carbon atoms, cycloalkyl, aryl or alkaryl, R" is hydroxy, alkoxy of from one to 30 carbon atoms, alkyl of from one to 30 carbon atoms, cycloalkyl, aryl or alkaryl and $n$ is from one to 10, and $m$ is zero, one or two;

said hydroxyphenone having the formula:

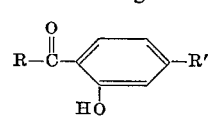

where R is selected from the group consisting of aryl, alkyl and cycloalkyl and R' is selected from the group consisting of hydrogen, alkyl, alkylene, cycloalkyl, hydroxy, alkyl, alkylene, cycloalkyl, hydroxy, alkoxy, alkyleneoxy, aryloxy, cycloalkoxy, hydroxy alkoxy and carboxyalkoxy;

said N-hydroxyphenyl benzotriazole having the formula:

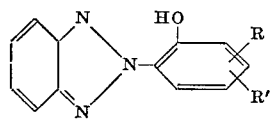

where R and R' are independently selected from hydrogen, alkyl of from one to 30 carbon atoms, and alkoxy of from one to 30 carbon atoms; and said salicylic ester being selected from the group consisting of phenyl salicylate and p-alkylphenyl salicylate in which the alkyl contains from one to 30 carbon atoms.

2. The synergistic mixture of claim 1 also containing at least one phenolic antioxidant.

3. The synergistic mixture of claim 2 wherein the phenolic antioxidant is selected from the group consisting of trialkylphenol, 1,1,3 - tris-(2-methyl-4-hydroxy-5-tert-butylphenyl)-butane and dilauryl-thiodipropionate.

4. Plastic normally subject to deterioration due to weathering containing, as an additive against said weathering, the synergistic mixture of claim 1.

5. The plastic of claim 4 containing the synergistic mixture of claim 3.

References Cited

UNITED STATES PATENTS

| 3,382,208 | 5/1968 | Cyba | 260—462 |
| 3,483,271 | 12/1969 | Holoch et al. | 260—45.8 |

FOREIGN PATENTS

| 1,097,959 | 1/1968 | Great Britain | 260—45.8 |

RICHARD D. LOVERING, Primary Examiner

I. GLUCK, Assistant Examiner

U.S. Cl. X.R.

260—45.7R, 462R